W. F. HUDSON.
RADIUS ROD TRUSS.
APPLICATION FILED APR. 26, 1919.
1,336,353. Patented Apr. 6, 1920.
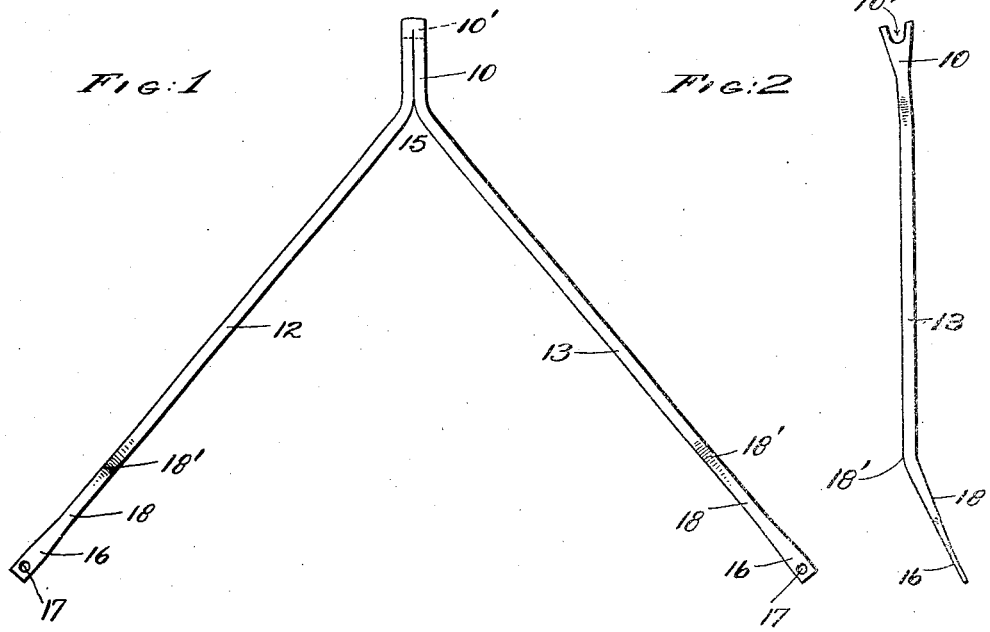
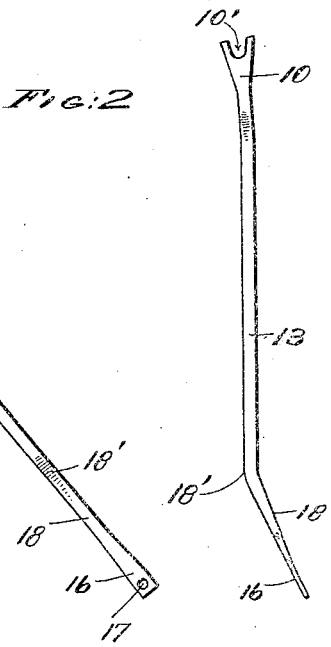
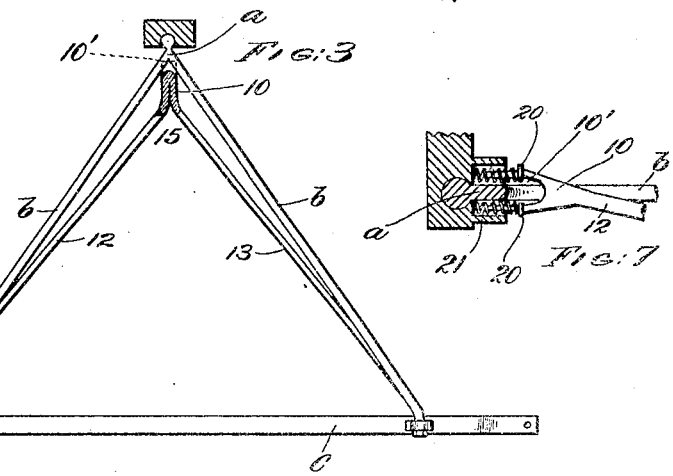
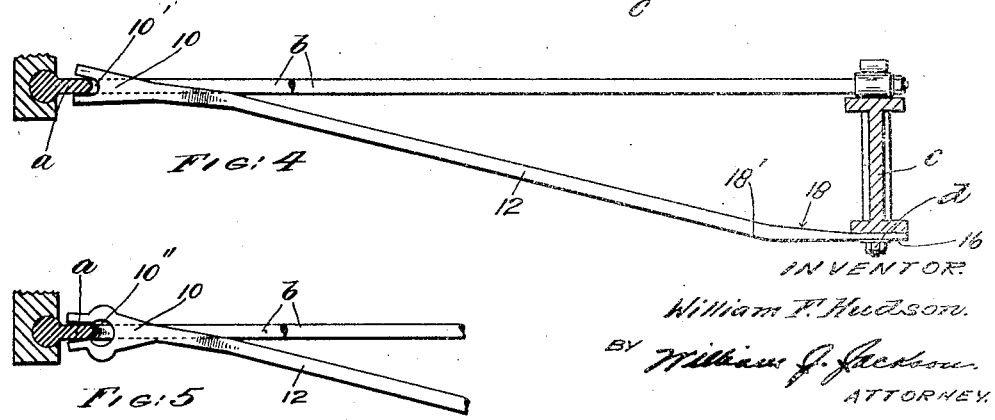
INVENTOR:
William F. Hudson.
BY William J. Jackson
ATTORNEY.

UNITED STATES PATENT OFFICE.

WILLIAM F. HUDSON, OF PHILADELPHIA, PENNSYLVANIA, ASSIGNOR TO HUDSON MOTOR SPECIALTIES COMPANY, OF PHILADELPHIA, PENNSYLVANIA, A CORPORATION OF PENNSYLVANIA.

RADIUS-ROD TRUSS.

1,336,353.  Specification of Letters Patent.  Patented Apr. 6, 1920.

Application filed April 26, 1919. Serial No. 292,963.

*To all whom it may concern:*

Be it known that I, WILLIAM F. HUDSON, a citizen of the United States, residing at the city of Philadelphia, county of Philadelphia, and State of Pennsylvania, have invented a certain new and useful Improved Radius-Rod Truss, of which the following is a specification.

This invention, generally stated, relates to radius rods for motor vehicles and relates more especially to a truss, brace or support used in conjunction with such radius rod as is commonly employed at the front of a motor vehicle.

As commonly employed at the front of a motor vehicle a radius rod is rigidly connected between the front axle and a lug upon the transmission casing. The transmission casing is of relatively thin metal and the lug is usually welded thereto. When the front wheels of a motor vehicle strike an obstruction the tendency of the axle is to move rearwardly with the result that the radius rod is apt to buckle or else weaken or break said lug connection. Under heavy loads upon rough roads the radius rods of a motor vehicle frequently bend and even break. Also this sometimes happens when a motor vehicle is driven at a high rate of speed. This is because ordinary radius rods are not efficient to resist rear thrust of the front axle of a motor vehicle.

The leading object of the present invention is to overcome the above stated disadvantageous features and provide a truss, brace or support for use in conjunction with a common radius rod, designed to possess sufficient flexibility so as to yield to the rear thrust of an axle and to assume its normal position when such thrust is relieved. A further object is to eliminate all attachable and detachable rigid connections with respect to the crotch of a common radius rod whereby not only may the present truss be more readily and freely fitted to place but the possibility of bolts, clamps and the like becoming loose is overcome. Another object is to provide a slip-joint between the neck of a common radius rod and the present truss.

The invention consists of the improvements hereinafter described and finally claimed.

The nature, characteristic features and scope of the invention will be more fully understood from the following description taken in connection with the accompanying drawings forming part hereof, and in which:

Figure 1, is a view in plan of a truss, brace or support embodying features of the present invention.

Fig. 2, is a view in side elevation thereof.

Fig. 3, is a fragmentary view in plan illustrating the mode of application of the truss with respect to a common radius rod.

Fig. 4, is a view in side elevation of Fig. 3.

Fig. 5, is a fragmentary view in side elevation illustrating a slightly different form of slip-joint arrangement, and Figs. 6 and 7 are similar views illustrating still further forms.

For the purpose of illustrating my invention I have shown in the accompanying drawings several forms thereof which are at present preferred by me, since the same have been found in practice to give satisfactory and reliable results, although it is to be undestood that the various instrumentalities of which my invention consists can be variously arranged and organized and that my invention is not limited to the precise arrangement and organization of the instrumentalities as herein shown and described.

In the drawings and referring more particularly to Figs. 1 and 2, 10 designates a neck which is forked or notched as at 10'. Diverging from this neck are a pair of arms 12 and 13 which form a fork 15. These forks are disposed in planes which are at right angles to one another, the fork 10' being horizontally disposed and the fork 15 being vertically disposed when the brace is in operative position. Considered in side elevation the neck 10 is V-shaped and lies in a plane which intersects the plane of the arms 12 and 13. The free ends of the arms 12 and 13 are flattened as at 16 and are drilled as at 17. That part of each arm intermediate said flattened portion and the arm proper, considered in side elevation, is beveled as at 18. A combined beveled and flattened portion lies in a plane which intersects the plane of an arm proper. That part of an arm connecting the beveled part 18 with the arm proper is generally curved as at 18'. In practice a truss is manufactured from spring steel and stamped from a single blank although obviously it is capable of being formed of several pieces.

In positioning this truss the forked portion of neck 10 is caused to straddle the neck *a* of the common radius rod *b*, it being understood that the uppermost prong or tine of the fork of neck 10 merely rests upon the top of neck *a*. The notch 10' of the neck 10 of the present truss is so formed that as shown in Fig. 4, the major portion of the prongs or tines of the neck lie to the rear of the crotch of the ordinary radius rod *b*. In Fig. 5, the notch 10'' is so formed that the prongs or tines of the neck lie entirely to the rear of the crotch of the radius rod *b*. The notches 10' and 10'' serve to provide means for a slip-joint between the neck of a truss and the neck of a radius rod. In other words a truss has free seating relation upon and has slip joint relation with a neck of a radius bar in contradistinction to attachable and detachable rigid connecting devices. It is not necessary to get under a car to effect the positioning of the truss. The flattened ends of the arms 12 and 13 are bolted to the axle *c* as at *d* either to the underside or top thereof according to the position of the ordinary radius rod. Because of the fact that the respective ends of the truss lie in planes which intersect the plane of the arms and because of the fact that spring steel is employed any rear thrust of an axle tends to cause the truss to yield first as a slip-joint and then spring fashion and at the same time to move around the neck of a common radius rod substantially ball-joint fashion. As rear thrust of a front axle is withdrawn the truss springs back into normal position. The truss is of simple construction, may be easily postioned, is yielding and flexible in character but efficient for bracing and supporting purposes and commercially considered is more practical than similar devices now upon the market.

Referring now to Fig. 6, a spring 19 is positioned between the notched part 10' of neck 10 and the forked part of the common radius rod *b* so that in addition to the slip-joint connection a cushioned relation of parts is effected. Referring to Fig. 7, the prongs or tines of neck 10 are each provided with a shoulder 20 and a spring 21 is coiled around each prong or tine and positioned between a shoulder 20 and the lug supporting the common radius rod.

It will now be apparent that I have devised a novel and useful construction which embodies the features of advantage enumerated as desirable in the statement of the invention and the above description and while I have in the present instance shown and described the preferred embodiments thereof which have been found in practice to give satisfactory and reliable results, it is to be understood that the same is susceptible of modification in various particulars without departing from the spirit or scope of the invention or sacrificing any of its advantages.

What I claim is:

1. In a motor vehicle construction an axle, a transmission casing, a forked radius rod connected between said axle and casing, a truss connected to said axle and provided with a forked neck the prongs of which lie substantially to the rear of the crotch of said forked radius rod and resilient means interposed between said casing and the free end of said truss.

2. In a motor vehicle construction an axle, a transmission casing, a radius rod having a neck, said rod being connected to said axle and transmission casing, a truss comprising a structure consisting of a notched neck freely engaging over and having limited sliding movement with respect to the neck of the radius rod, the truss neck terminating in flexible and diverging arms and means for rigidly connecting the free ends of said arms to said axle whereby rear thrust of said axle tends to cause said truss to first slide with respect to the radius rod under slight thrust and then to yield under greater thrust.

In testimony whereof, I have hereunto signed my name.

WILLIAM F. HUDSON.